US012790868B2

(12) United States Patent
Prior

(10) Patent No.: US 12,790,868 B2
(45) Date of Patent: Nov. 10, 2026

(54) VEHICLE TAILGATE LIFT ASSIST HINGE ASSEMBLIES

(71) Applicant: FORD GLOBAL TECHNOLOGIES, LLC, Dearborn, MI (US)

(72) Inventor: Joseph Prior, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 311 days.

(21) Appl. No.: 18/434,950

(22) Filed: Feb. 7, 2024

(65) Prior Publication Data

US 2025/0250837 A1 Aug. 7, 2025

(51) Int. Cl.
*E05F 1/12* (2006.01)
*B62D 33/027* (2006.01)

(52) U.S. Cl.
CPC ........ *E05F 1/1215* (2013.01); *B62D 33/0273* (2013.01); *E05Y 2900/544* (2013.01)

(58) Field of Classification Search
CPC ............... E05F 1/1215; B62D 33/0273; E05Y 2900/544; E05Y 2600/524; E05Y 2800/21; E05D 3/02; E05D 5/06
USPC ........................................................ 296/183.1
See application file for complete search history.

(56) References Cited

U.S. PATENT DOCUMENTS 3,825,973 A 7/1974 Gwozdz
6,793,263 B1 * 9/2004 Bruford ............. B62D 33/0273 49/386
7,673,929 B2 3/2010 Patzer et al.
8,348,325 B2 * 1/2013 Hausler .............. B62D 33/0273 296/62
9,677,311 B2 6/2017 Shaw et al.
9,809,142 B1 * 11/2017 White ................ B62D 33/0273
10,569,812 B2 2/2020 Tyagi et al.
11,111,710 B2 * 9/2021 Ulewicz ................ E05D 7/1072
11,498,626 B2 11/2022 Griffith et al.
2004/0262938 A1 * 12/2004 Bruford ............. B62D 33/0273 296/50
2005/0285425 A1 * 12/2005 Romig ...................... B60P 1/26 296/50

(Continued)

FOREIGN PATENT DOCUMENTS

| | | | |
|---|---|---|---|
| EP | 1697204 | B1 | 9/2008 |
| EP | 2405090 | B1 | 9/2014 |
| WO | 2016175713 | A1 | 11/2016 |

*Primary Examiner* — Muhammad Shafi
(74) *Attorney, Agent, or Firm* — Vichit Chea; Carlson, Gaskey & Olds, P.C.

(57) ABSTRACT

Hinge assemblies are provided that are capable of providing lift assistive forces when moving a tailgate of a motor vehicle from a tailgate open position to a tailgate closed position. An exemplary hinge assembly may include a body-side or stationary hinge component, a tailgate-side or movable hinge component, and a pivot rod that pivotably connects the movable hinge component to the stationary hinge component. The hinge assembly may additional include one or more spring assemblies each having a carrier and a spring. The spring assembly may be configured to store energy when the tailgate is moved from the tailgate closed position to the tailgate open position. The stored energy can be subsequently released to reduce the amount of lifting effort necessary for a user to return the tailgate back to the tailgate closed position.

20 Claims, 5 Drawing Sheets

(56) References Cited

U.S. PATENT DOCUMENTS

| | | | | |
|---|---|---|---|---|
| 2006/0082181 | A1* | 4/2006 | Austin | B62D 33/03 296/57.1 |
| 2006/0225247 | A1 | 10/2006 | Duffy | |
| 2008/0066385 | A1* | 3/2008 | Roach | E05F 1/1091 49/386 |
| 2008/0217949 | A1* | 9/2008 | Kobrehel | B60P 1/435 296/61 |
| 2019/0054961 | A1* | 2/2019 | Ngo | B60R 3/02 |
| 2021/0284251 | A1* | 9/2021 | Dearing | E05D 5/062 |

* cited by examiner

VEHICLE TAILGATE LIFT ASSIST HINGE ASSEMBLIES

TECHNICAL FIELD

This disclosure relates generally to motor vehicles, and more particularly to hinge assemblies that are capable of providing lift assistive forces when closing a tailgate of a motor vehicle.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed. Some tailgates include features (integrated steps, door subassemblies, etc.) that increase their weight and thus potentially make them more difficult to close for some users.

SUMMARY

A tailgate lift assist hinge assembly according to an exemplary aspect of the present disclosure includes, among other things, a stationary hinge component, a movable hinge component, a pivot rod that pivotably connects the movable hinge component to the stationary hinge component, and a first spring assembly including a first carrier received onto a first outboard section of the pivot rod and a first spring carried by the first carrier.

In a further non-limiting embodiment of the foregoing tailgate lift assist hinge assembly, a second spring assembly includes a second carrier received onto a second outboard section of the pivot rod and a second spring carried by the second carrier.

In a further non-limiting embodiment of either of the foregoing tailgate lift assist hinge assemblies, the first outboard section of the pivot rod extends outboard of both the movable hinge component and the stationary hinge component, and the second outboard section of the pivot rod extends outboard of both the movable hinge component and the stationary hinge component.

In a further non-limiting embodiment of any of the foregoing tailgate lift assist hinge assemblies, the first carrier is received onto a first knurled surface of the first outboard section, and the second carrier is received into a second knurled surface of the second outboard section.

In a further non-limiting embodiment of any of the foregoing tailgate lift assist hinge assemblies, the first outboard section of the pivot rod extends outboard of both the movable hinge component and the stationary hinge component.

In a further non-limiting embodiment of any of the foregoing tailgate lift assist hinge assemblies, the first carrier is received onto a first knurled surface of the first outboard section.

In a further non-limiting embodiment of any of the foregoing tailgate lift assist hinge assemblies, the first spring includes a first end, a second end, and a plurality of coils arranged between the first end and the second end.

In a further non-limiting embodiment of any of the foregoing tailgate lift assist hinge assemblies, the first end is received through a hole formed through the stationary hinge component.

In a further non-limiting embodiment of any of the foregoing tailgate lift assist hinge assemblies, the second end is received within a slot formed in the movable hinge component.

In a further non-limiting embodiment of any of the foregoing tailgate lift assist hinge assemblies, the plurality of coils includes at least two coils wrapped around the first carrier.

In a further non-limiting embodiment of any of the foregoing tailgate lift assist hinge assemblies, the plurality of coils includes at least three coils wrapped around the first carrier.

In a further non-limiting embodiment of any of the foregoing tailgate lift assist hinge assemblies, the plurality of coils includes at least four coils wrapped around the first carrier.

A motor vehicle according to another exemplary aspect of the present disclosure includes, among other things, a vehicle body, a tailgate, and a first hinge assembly configured to provide a lift assistive force when moving the tailgate from a tailgate open position to a tailgate closed position relative to the vehicle body. The first hinge assembly includes a body-side hinge component mounted to the vehicle body, a tailgate-side hinge component mounted to the tailgate, a pivot rod that pivotably connects the tailgate-side hinge component to the body-side hinge component, and a spring connected to both the body-side hinge component and the tailgate-side hinge component.

In a further non-limiting embodiment of the foregoing motor vehicle, the vehicle body includes a cargo bed, and the body-side hinge component is mounted to a rear end wall of the cargo bed.

In a further non-limiting embodiment of either of the foregoing motor vehicles, the tailgate-side hinge component is mounted to a bottom wall of the tailgate.

In a further non-limiting embodiment of any of the foregoing motor vehicles, a carrier is mounted to the pivot rod.

In a further non-limiting embodiment of any of the foregoing motor vehicles, the carrier is received onto a knurled surface of the pivot rod.

In a further non-limiting embodiment of any of the foregoing motor vehicles, the knurled surface is located on an outboard section of the pivot rod that extends outboard of both the body-side hinge component and the tailgate-side hinge component.

In a further non-limiting embodiment of any of the foregoing motor vehicles, the spring is at least partially wrapped around the carrier.

In a further non-limiting embodiment of any of the foregoing motor vehicles, a first end of the spring is received through a hole formed through the body-side hinge component, and a second end of the spring is received within a slot formed in the tailgate-side hinge component.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details hinge assemblies that are capable of providing lift assistive forces when moving a tailgate of a motor vehicle from a tailgate open position to a tailgate closed position. An exemplary hinge assembly may include a body-side or stationary hinge component, a tailgate-side or movable hinge component, and a pivot rod that pivotably connects the movable hinge component to the stationary hinge component. The hinge assembly may additional include one or more spring assemblies each having a carrier and a spring. The spring assembly may be configured to store energy when the tailgate is moved from the tailgate closed position to the tailgate open position. The stored energy can be subsequently released to reduce the amount of lifting effort necessary for a user to return the tailgate back to the tailgate closed position. These and other features of this disclosure are described in greater detail below.

Figure 1:
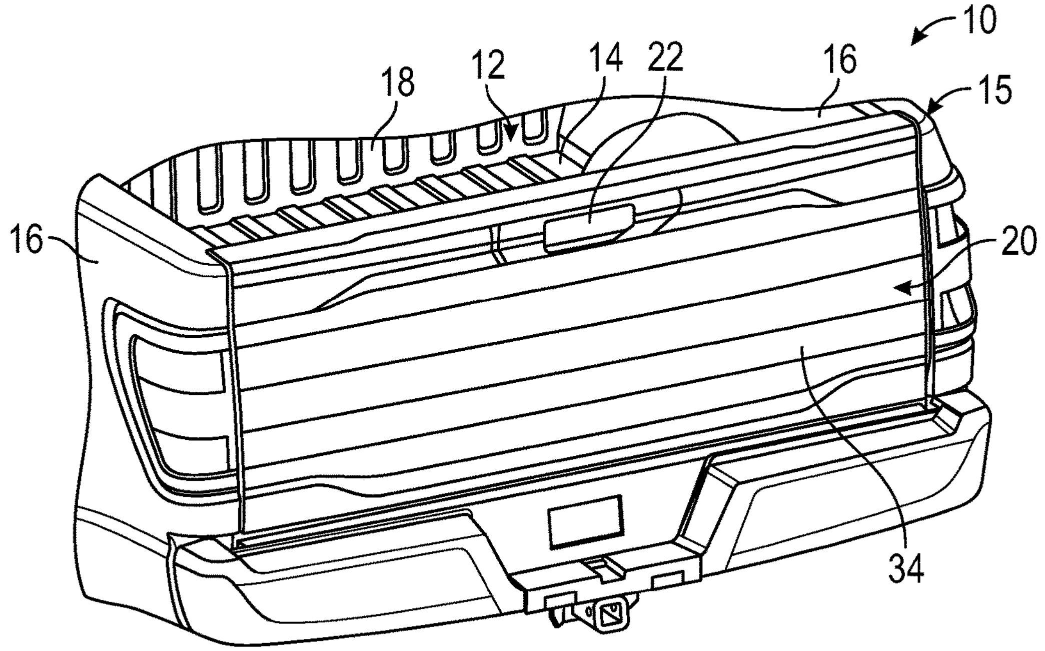
FIG. 1 is a rear perspective view of a motor vehicle equipped with a tailgate positioned in a tailgate closed position.
Figure 2:
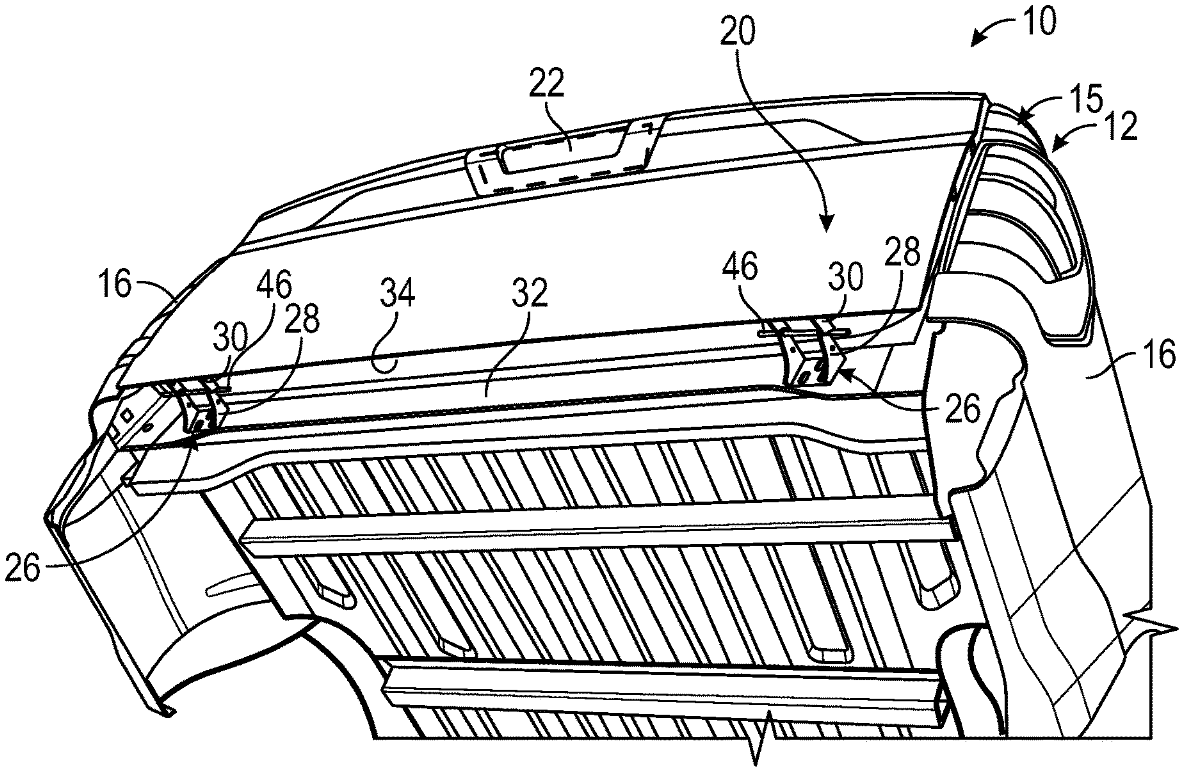
FIG. 2 is a bottom perspective view of select portions of the motor vehicle of FIG. 1.
Figure 3:
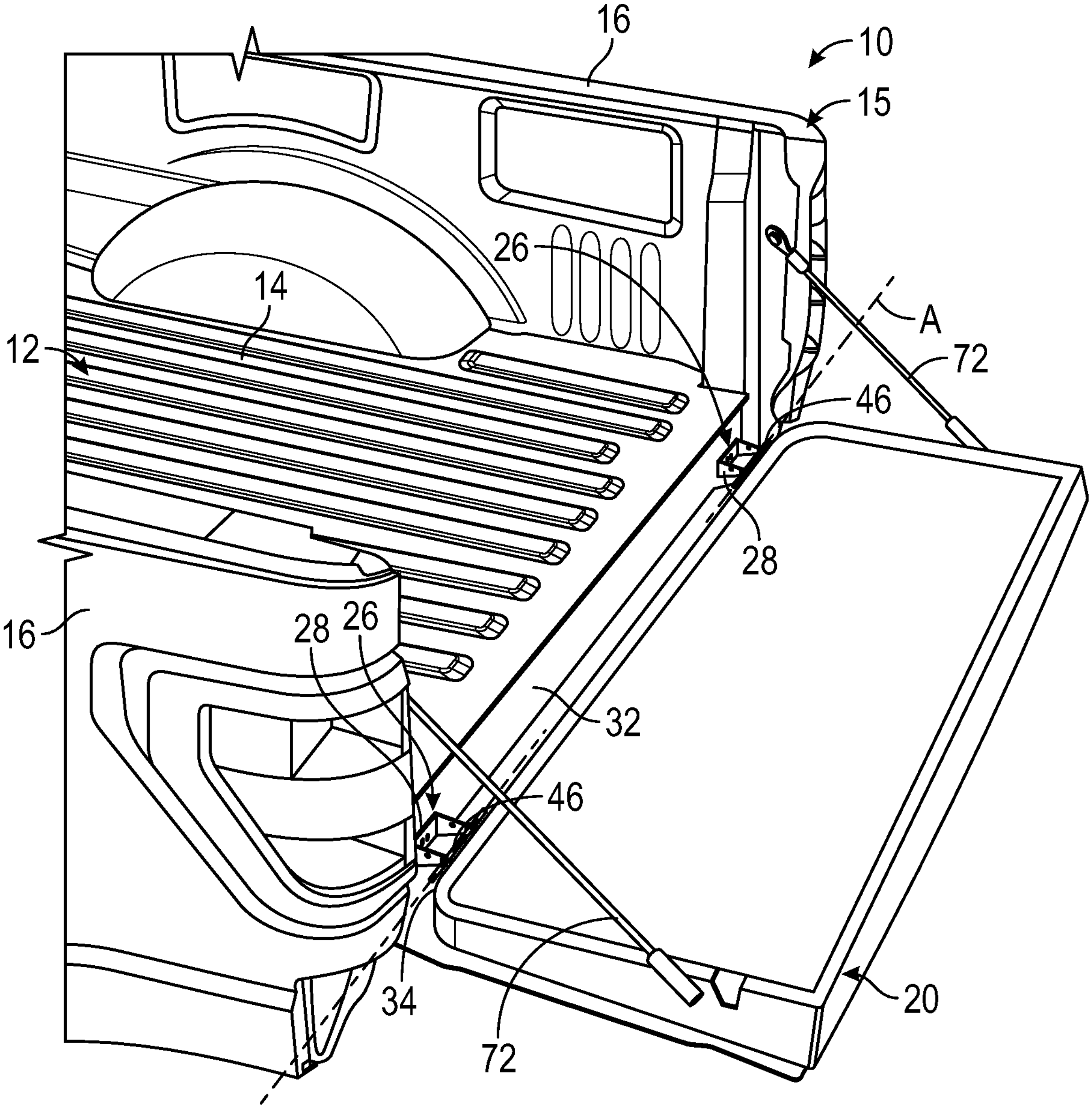
FIG. 3 illustrates the tailgate of FIGS. 1 and 2 in a tailgate open position.
Figure 4:
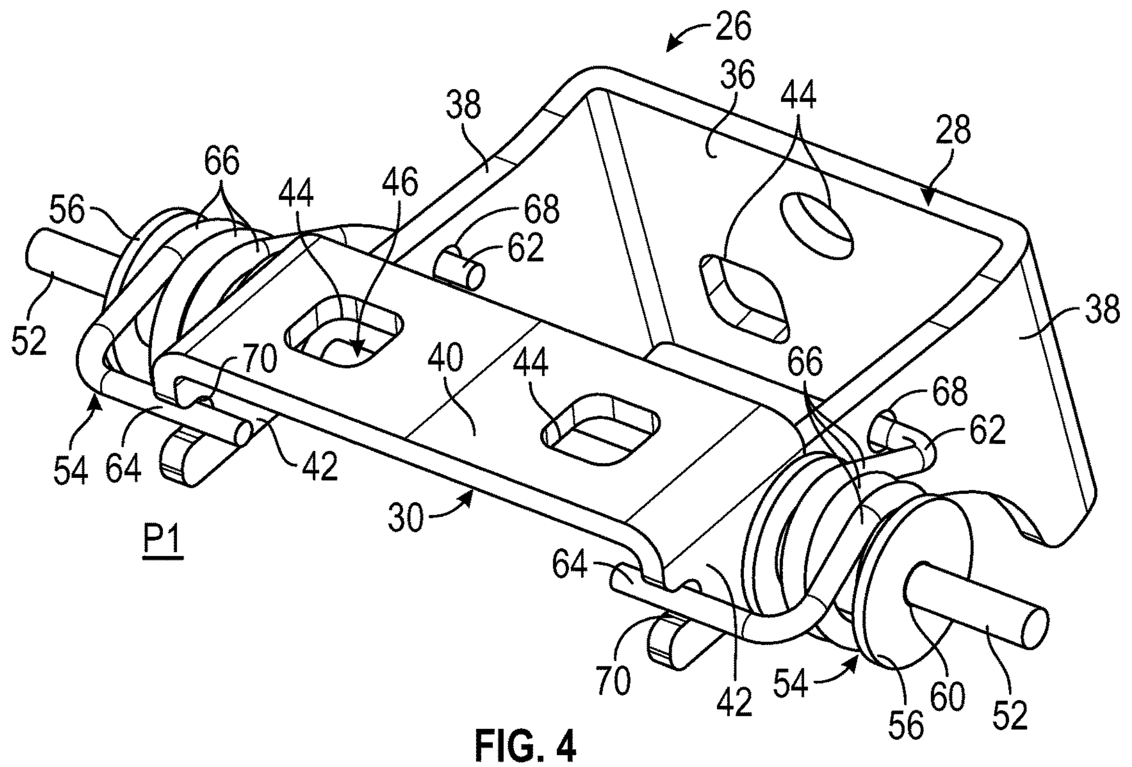
FIG. 4 illustrates a first position of an exemplary tailgate lift assist hinge assembly.
Figure 5:
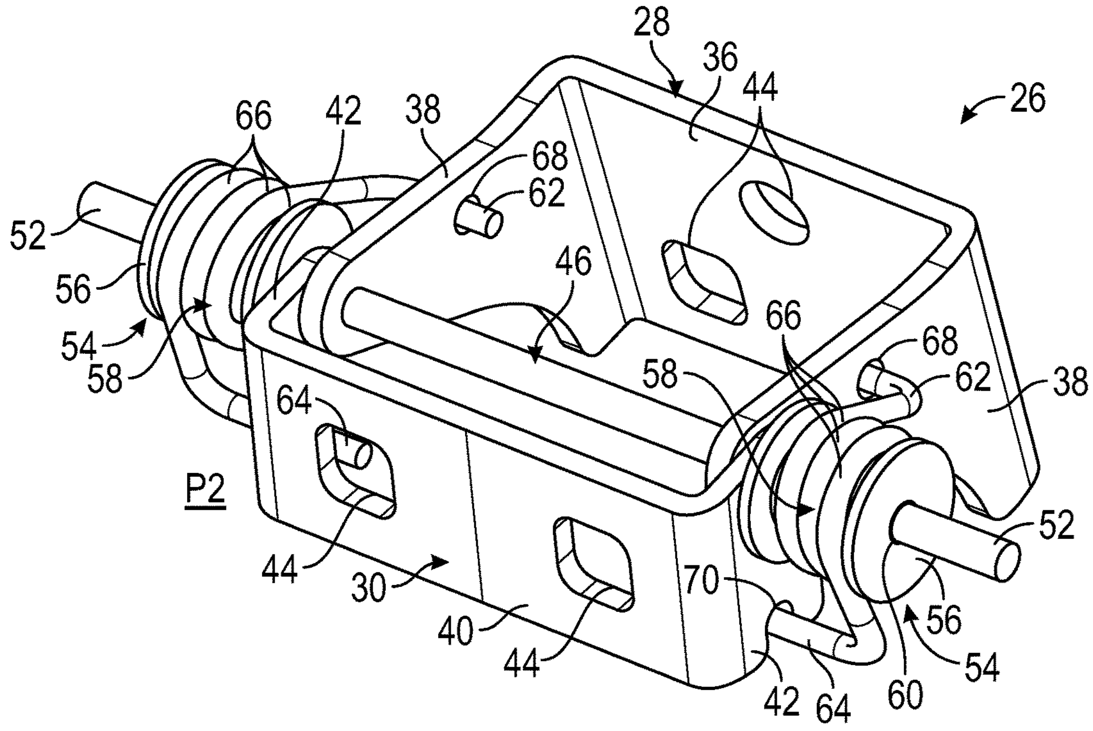
FIG. 5 illustrates a second position of the tailgate lift assist hinge assembly of FIG. 4.
Figure 6:
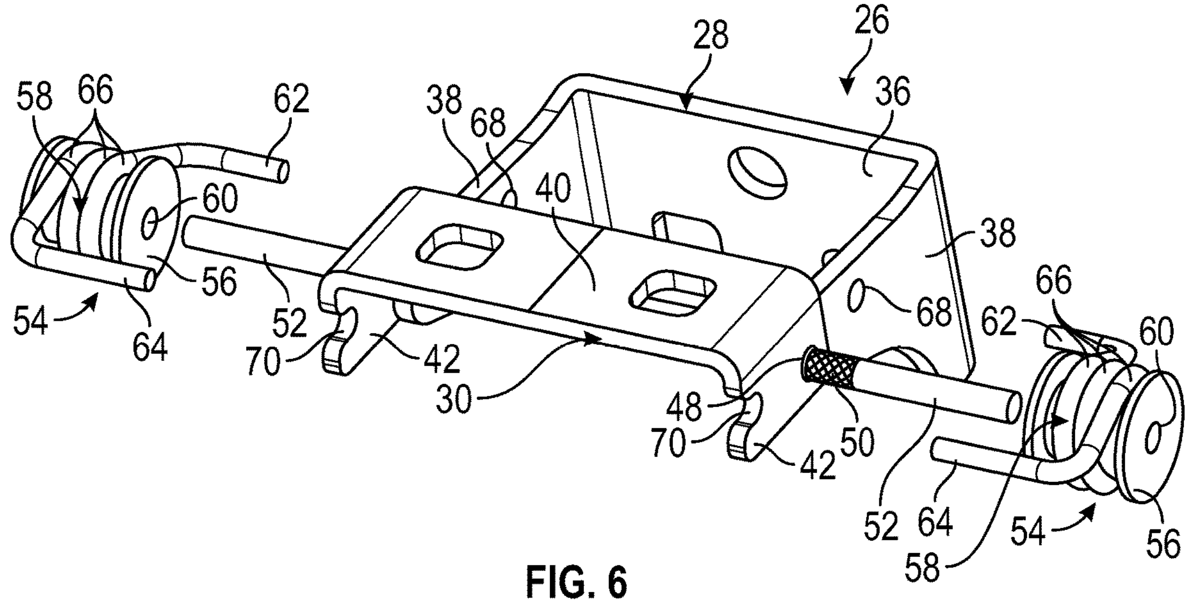
FIG. 6 is an exploded view of the tailgate lift assist hinge assembly of FIG. 4.
Figure 7:
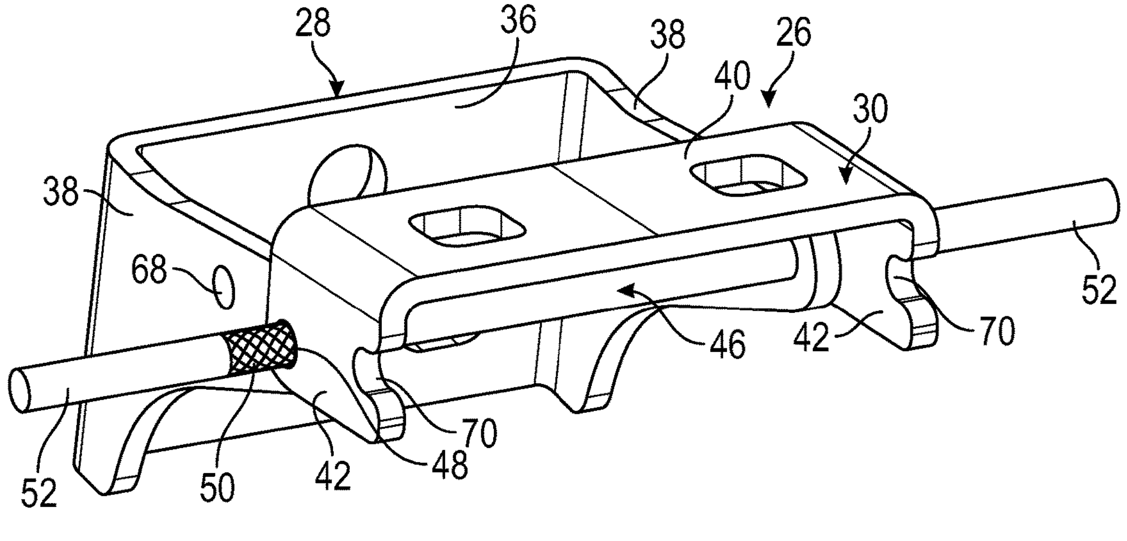
FIG. 7 illustrates select portions of the tailgate lift assist hinge assembly of FIG. 4.

FIGS. 1, 2, and 3 illustrate select portions of a motor vehicle 10 that includes a cargo space for storing and/or hauling one or more items of cargo. In the illustrated embodiment, the vehicle 10 is a pickup truck, and the cargo space is established by a cargo bed 12 of the pickup truck. While a pickup truck with a cargo bed is specifically depicted and referenced herein, other vehicles, such as a sport utility vehicle, for example, having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component, assembly, or system.

The cargo bed 12 is generally rearward of a passenger cabin (not shown) of the vehicle 10 and includes a floor 14 extending between a pair of longitudinally extending side walls 16, a laterally extending front wall 18, and a tailgate 20. The overall size, shape, and configuration of the cargo bed 12 are not intended to limit this disclosure. The cargo bed 12 is part of a vehicle body 15 of the vehicle 10.

In some implementations, the tailgate 20 could be a conventional tailgate such as that commonly provided on pickup trucks, for example. In other implementations, the tailgate 20 could be part of a split gate system that includes both a lift gate portion and a tailgate portion. Accordingly, the specific configuration of the tailgate 20 is not intended to limit this disclosure The tailgate 20 is pivotable about a pivot axis A relative to the cargo bed 12 between a tailgate closed position shown in FIGS. 1 and 2 and a tailgate open position shown in FIG. 3. The tailgate 20 may be moved from the tailgate closed position to the tailgate open position in response to actuating a handle 22 of the tailgate 20, for example. The tailgate 20 is vertically aligned when in the tailgate closed position and thus generally encloses an end of the cargo bed 12 that is opposite from the front wall 18. The tailgate 20 is horizontally aligned when in the tailgate open position and thus generally allows access to the cargo bed 12. Vertical and horizontal, for purposes of this disclosure, are with reference to ground in the ordinary orientation of the vehicle 10 during its operation.

The tailgate 20 may be movably connected to the vehicle body 15 by one or more hinge assemblies 26. The hinge assemblies 26 movably support the tailgate 20 relative to the vehicle body 15. Although two hinge assemblies are illustrated in the exemplary embodiment, the tailgate 20 could be movably supported relative to the vehicle body 15 by a greater or fewer number of hinge assemblies.

One or more additional components could be utilized in combination with the hinge assemblies 26 as part of a tailgate support system for movably supporting the tailgate 20 relative to the vehicle body 15. In an embodiment, the tailgate 20 is additionally supported relative to the vehicle body 15 by a pair of cables 72 (see FIG. 3). However, other component, such as gas struts, for example, could alternatively or additionally be provided as part of the tailgate support system within the scope of this disclosure.

FIGS. 4, 5, 6, and 7, with continued reference to FIGS. 1-3, further illustrate details associated with the hinge assembly 26. The hinge assembly 26 may include a stationary hinge component 28 and a movable hinge component 30. The stationary hinge component 28 is a body-side hinge component of the hinge assembly 26 that can be mounted to the vehicle body 15 by one or more mechanical fasteners (not shown). In an embodiment, the stationary hinge component 28 is mounted to a rear end wall 32 (see FIGS. 2-3) of the cargo bed 12 of the vehicle body 15. The hinge assembly 26 may therefore be considered a sill mounted hinge assembly. The rear end wall 32 may extend in parallel with the front wall 18 of the cargo bed and may thus extend perpendicularly to a longitudinal centerline of the vehicle 10.

The movable hinge component 30 is a tailgate-side hinge component of the hinge assembly 26 and may be mounted to a bottom wall 34 (see FIGS. 2-3) of the tailgate 20 by one or more additional mechanical fasteners (not shown). The bottom wall 34 may extend parallel to ground when the tailgate 20 is in the tailgate closed position and may extend in parallel with the rear end wall 32 when the tailgate 20 is in the tailgate open position.

The stationary hinge component 28 may include a base portion 36 and bracket arm portions 38 that extend away from the base portion 36, and the movable hinge component 30 may also include a base portion 40 and bracket arm portions 42 that extend away from the base portion 40. The base portions 36, 40 may each include one or more mounting openings 44 configured for receiving fasteners for mounting the stationary hinge component 28 to the vehicle body 15 and the movable hinge component 30 to the tailgate 20, respectively. The bracket arms portions 38, 42 may be configured to interface with one another for movably mounting the movable hinge component 30 to the stationary hinge component 28. In an embodiment, both the stationary hinge component 28 and the movable hinge component 30 are unitary, single-piece, generally U-shaped components.

The movable hinge component 30 may be pivotably connected to the stationary hinge component 28 by a pivot rod 46. The movable hinge component 30 may be pivoted about the pivot rod 46 between a first position P1 shown in FIG. 4 and a second position P2 shown in FIG. 5. The first position P1 coincides with the tailgate 20 in the tailgate closed position of FIGS. 1 and 2, and the second position P2 coincides with the tailgate 20 in the tailgate open position of FIG. 3.

The pivot rod 46 may extend through openings 48 (see FIGS. 6-7) provided by the bracket arm portions 38 and the bracket arm portions 42. A knurled surface 50 (see FIGS. 6-7) may be provided on each outboard section 52 of the pivot rod 46 that extends outboard of both the bracket arm portions 38 of the stationary hinge component 28 and the bracket arm portions 42 of the movable hinge component 30.

A spring assembly 54 may be secured onto each outboard section 52 of the pivot rod 46. For example, one spring assembly 54 may be press fit onto each knurled surface 50 of the pivot rod 46.

Each spring assembly 54 may include a carrier 56 and a spring 58 that is coiled around and carried by the carrier 56. The carrier 56 may include a spool-like design. The carrier 56 may include an internal bore 60 through which the pivot rod 46 may pass for positioning the carrier 56 over the knurled surface 50 of one of the outboard sections 52 of the pivot rod 46. The spring 58 may be a torsion spring or a coil spring, for example.

The spring 58 may include a first end 62, a second end 64, and a plurality of coils 66 arranged between the first end 62 and the second end 64. The first end 62 of the spring 58 may be received through a hole 68 formed through one of the bracket arms portions 38 of the stationary hinge component 28, and the second end 64 of the spring 58 may be received within a slot 70 formed in one of the bracket arm portions 42 of the movable hinge component 30. Each coil 66 may be at least partially wrapped around the spool-like carrier 56.

The spring assemblies 54 may provide a lift assist function when moving the tailgate 20 from the tailgate open position to the tailgate closed position. For example, each spring 58 may wind (e.g., twist) and thereby store energy as the tailgate 20 is moved from the tailgate closed position to the tailgate open position. When a user subsequently exerts an external force to move the tailgate 20 from the tailgate open position back to the tailgate closed position, each spring 58 may release the stored energy and thereby reduce the amount of lifting effort required to be exerted by the user to close the tailgate 20.

Figure 8:
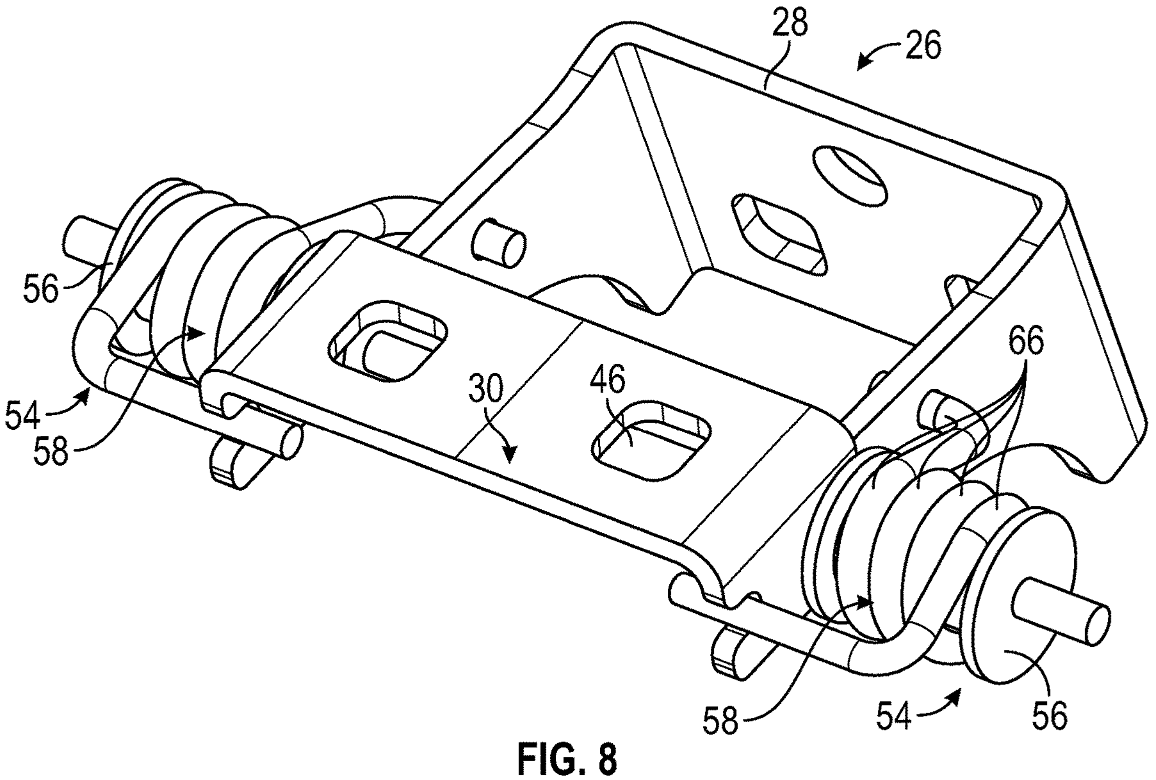
FIG. 8 illustrates another exemplary tailgate lift assist hinge assembly.
Figure 9:
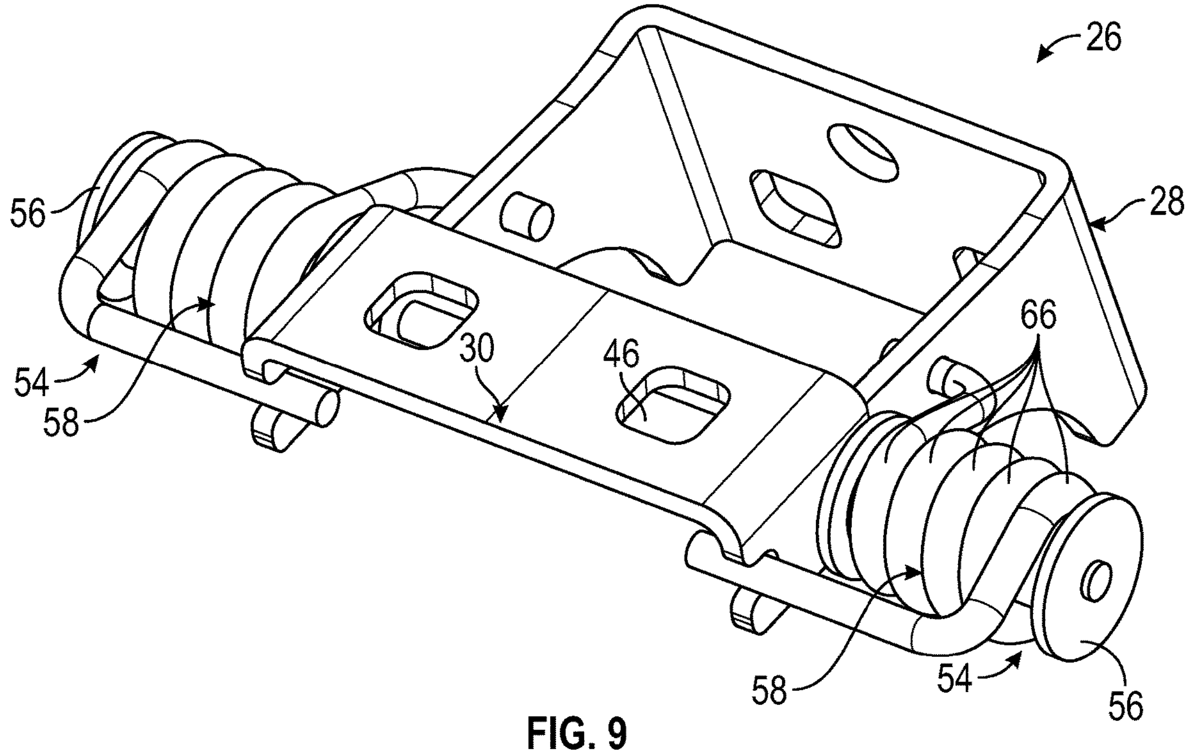
FIG. 9 illustrates yet another exemplary tailgate lift assist hinge assembly.

Certain design characteristics (e.g., diameter, number of coils, etc.) of the springs 58 of the spring assemblies 54 can be tailored to achieve a desired lift assist requirement. For example, for light duty tailgate applications, each spring 58 may include a first diameter (e.g., about 4 mm) and a first number of coils 66 (e.g., about 2.5) (see, for example, the configuration shown in FIGS. 4, 5, and 6). For medium duty tailgate applications, each spring 58 may include a second diameter (e.g., about 5 mm) and a second number of coils 66 (e.g., about 3.5) (see, for example, the configuration shown in FIG. 8). For heavy duty tailgate applications, each spring 58 may include a third diameter (e.g., about 6 mm) and a third number of coils 66 (e.g., about 4.5) (see, for example, the configuration shown in FIG. 9). However, other spring configurations are contemplated within the scope of this disclosure.

In this disclosure, the term "about' means that the expressed quantities or ranges need not be exact but may be approximated and/or larger or smaller, reflecting acceptable tolerances, conversion factors, measurement error, etc.

The hinge assemblies of this disclosure are equipped to provide tailgate lift assistive forces in a less complex and more effective design compared to prior hinge systems. The proposed hinges therefore increase customer satisfaction while providing maximum usability and ease of manufacturing.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tailgate lift assist hinge assembly, comprising:
- a stationary hinge component;
- a movable hinge component;
- a pivot rod that pivotably connects the movable hinge component to the stationary hinge component; and
- a first spring assembly including a first carrier received onto a first outboard section of the pivot rod and a first spring carried by the first carrier.

2. The tailgate lift assist hinge assembly as recited in claim 1, comprising a second spring assembly including a second carrier received onto a second outboard section of the pivot rod and a second spring carried by the second carrier.

3. The tailgate lift assist hinge assembly as recited in claim 2, wherein the first outboard section of the pivot rod extends outboard of both the movable hinge component and the stationary hinge component, and the second outboard section of the pivot rod extends outboard of both the movable hinge component and the stationary hinge component.

4. The tailgate lift assist hinge assembly as recited in claim 3, wherein the first carrier is received onto a first knurled surface of the first outboard section, and the second carrier is received into a second knurled surface of the second outboard section.

5. The tailgate lift assist hinge assembly as recited in claim 1, wherein the first outboard section of the pivot rod extends outboard of both the movable hinge component and the stationary hinge component.

6. The tailgate lift assist hinge assembly as recited in claim 1, wherein the first carrier is a spool-like structure of the first spring assembly.

7. The tailgate lift assist hinge assembly as recited in claim 1, wherein the first carrier includes an internal bore through which the first outboard section of the pivot rod extends, the internal bore being sized to receive the first outboard section in a press fit.

8. A tailgate lift assist hinge assembly comprising:

a stationary hinge component;

a movable hinge component;

a pivot rod that pivotably connects the movable hinge component to the stationary hinge component; and a first spring assembly including a first carrier received onto a first outboard section of the pivot rod and a first spring carried by the first carrier, wherein the first outboard section of the pivot rod extends outboard of both the movable hinge component and the stationary hinge component, wherein the first carrier is received onto a first knurled surface of the first outboard section.

9. The tailgate lift assist hinge assembly as recited in claim 1, wherein the first spring includes a first end, a second end, and a plurality of coils arranged between the first end and the second end.

10. The tailgate lift assist hinge assembly as recited in claim 9, wherein the first end is received through a hole formed through the stationary hinge component.

11. The tailgate lift assist hinge assembly as recited in claim 9, wherein the second end is received within a slot formed in the movable hinge component.

12. The tailgate lift assist hinge assembly as recited in claim 9, wherein the plurality of coils includes at least two coils wrapped around the first carrier.

13. The tailgate lift assist hinge assembly as recited in claim 9, wherein the plurality of coils includes at least three coils wrapped around the first carrier.

14. The tailgate lift assist hinge assembly as recited in claim 9, wherein the plurality of coils includes at least four coils wrapped around the first carrier.

15. A motor vehicle, comprising:

a vehicle body;

a tailgate; and a first hinge assembly configured to provide a lift assistive force when moving the tailgate from a tailgate open position to a tailgate closed position relative to the vehicle body, wherein the first hinge assembly includes a body-side hinge component mounted to the vehicle body, a tailgate-side hinge component mounted to the tailgate, a pivot rod that pivotably connects the tailgate-side hinge component to the body-side hinge component, a carrier mounted to the pivot rod, and a spring connected to both the body-side hinge component and the tailgate-side hinge component and at least partially wrapped around the carrier.

16. The motor vehicle as recited in claim 15, wherein the vehicle body includes a cargo bed, and the body-side hinge component is mounted to a rear end wall of the cargo bed.

17. The motor vehicle as recited in claim 15, wherein the tailgate-side hinge component is mounted to a bottom wall of the tailgate.

18. The motor vehicle as recited in claim 15, wherein the carrier is received onto a knurled surface of the pivot rod.

19. The motor vehicle as recited in claim 18, wherein the knurled surface is located on an outboard section of the pivot rod that extends outboard of both the body-side hinge component and the tailgate-side hinge component.

20. The motor vehicle as recited in claim 15, wherein a first end of the spring is received through a hole formed through the body-side hinge component, and a second end of the spring is received within a slot formed in the tailgate-side hinge component.

* * * * *